May 24, 1966    J. K. JACKSON ETAL    3,252,283
GAS TURBINE FUEL SYSTEM

Filed Feb. 26, 1963    2 Sheets-Sheet 1

INVENTORS
JOHN K. JACKSON
BY ALEXANDER SILVER

Herschel C. Omohundro
ATTORNEY

May 24, 1966

J. K. JACKSON ETAL 3,252,283

GAS TURBINE FUEL SYSTEM

Filed Feb. 26, 1963

INVENTORS
JOHN K. JACKSON
BY ALEXANDER SILVER

Herschel C. Omohundro
ATTORNEY

United States Patent Office 3,252,283
Patented May 24, 1966

3,252,283
GAS TURBINE FUEL SYSTEM
John K. Jackson, Torrance, and Alexander Silver, Tarzana, Calif., assignors to The Garrett Corporation, Los Angeles, Calif., a corporation of California
Filed Feb. 26, 1963, Ser. No. 261,146
13 Claims. (Cl. 60—39.28)

This application is a continuation-in-part of application Serial No. 101,140, filed April 6, 1961, now abandoned, in the names of John K. Jackson and Alexander Silver for a Gas Turbine Fuel System, which in turn is a continuation of application Serial No. 580,925, filed April 26, 1956, now abandoned.

The present invention relates to a gas turbine fuel system, and more particularly to a fuel system which provides for proper operation of a gas turbine during starting, acceleration thereof to a normal operating speed, and during steady state operating conditions.

During acceleration of a gas turbine, immediately after it is started, the fuel pump thereof may increase fuel pressure at a rate which is out of proportion to the increase of compressor output pressure and the acceleration rate of the turbine. Under such conditions, a fixed area fuel nozzle communicating with the fuel pump permits excessive fuel flow to the combustor of the gas turbine. Since the compressor air flow increases at a lower rate than the fuel pump output pressure, it has been difficult to obtain a proper fuel mixture; consequently, the temperature of the turbine tends to increase at an undesirable rate.

Heretofore, a thermostat has been employed to sense turbine outlet temperature and to control a fuel bypass valve arranged to regulate fuel pressure supplied to a fuel nozzle during turbine starting operations.

When a thermostat is used to control fuel pressure or flow in accordance with turbine outlet temperature during starting of a gas turbine, undesirable thermal stresses are created within the structures of the thermostat which tend to reduce the life thereof. Modulation of fuel flow or pressure by means of a thermostat may cause the outlet temperature of the turbine to fluctuate, which in turn reacts upon the thermostat in a detrimental manner. It has been recognized that a thermostat is required in a gas turbine fuel system as a safety device to control overload conditions of the gas turbine and that the temperature control system will be more reliable if the thermostat is not employed as a primary control device; consequently, it is desirable to use the thermostat as an overload protective device.

In addition, there has been a need for a gas turbine fuel system wherein fuel bypass features for controlling the operating conditions during starting properly cooperate with fuel bypass features which are responsive to speed and are employed to control steady state and overload operating conditions of the turbine.

In accordance with the present invention, starting operation of a gas turbine fuel system has been successfully controlled by utilizing a fuel flow signal cooperatively with compressor output pressure to regulate a fuel bypass valve.

The present invention also employs a speed responsive fuel bypass governor in combination with a fuel bypass valve which is responsive to both compressor output pressure and fuel flow to a fuel nozzle. In addition, a thermostat is arranged to cooperate with the last-mentioned fuel bypass valve to control overload operation of the gas turbine and thereby prevent overheating thereof. Thus, according to the present invention, starting operations of a gas turbine fuel system are controlled by the fuel bypass valve which is sensitive to fuel flow and compressor output pressure, while steady state operations of the gas turbine are controlled by the speed responsive fuel bypass governor, the bypass valve and governor being arranged in parallel in the fuel system.

An object of the present invention is to provide a gas turbine fuel system which automatically controls the operation of a gas turbine during starting, subsequent acceleration to normal operating speed, steady state operation at normal speed, and also during overload operating conditions.

Another object of the invention is to provide a gas turbine fuel system in which a thermostat, disposed to sense turbine outlet temperature, is utilized to control overload operating conditions, but is not normally otherwise subjected to rapid or excessive fluctuations in the turbine outlet temperature, whereby its life is prolonged and its function in the fuel system is more reliable.

Another object of the invention is to provide a gas turbine fuel system having a novel fuel bypass valve which is capable of scheduling the pressure of fuel supplied to the gas turbine fuel nozzle in accordance with output pressure of the compressor of the gas turbine and fuel flow to said nozzle during acceleration and under predetermined overload conditions of the gas turbine.

Another object of the invention is to provide a gas turbine fuel system having individual elements which cooperate in a novel and reliable manner to properly control fuel used by the gas turbine during starting, transient, steady state, and overload operations.

Another object of the invention is to provide a gas turbine fuel system which will permit the starting and acceleration of a gas turbine to its full operating speed within a minimum length of time.

A further object of the invention is to provide a gas turbine fuel system having a novel fuel bypass valve wherein a bypass valve element is disposed between a compressor output sensing diaphragm and a fuel flow sensing diaphragm, whereby compressor output pressure opposes pressure produced by fuel fflow to cause opening or closing movement of said valve element.

An additional object of the invention is to provide a gas turbine fuel system which is very simple and economical to produce in proportion to the automatic functions of which it is capable.

It is also an object of the invention to provide a novel bypass valve for use in a fuel system of a gas turbine engine, the fuel system having a simple constant volume fuel pump, the bypass valve being operative during the starting phase of engine operation to bypass excess fuel in response to a force resulting from fuel flow, then when engine operation has been initiated to utilize compressor outlet pressure to prevent the bypassing of fuel, means also being provided to cause the bypassing of fuel even though the engine is in full operation if an emergency arises which causes an overtemperature condition to exist in the engine exhaust outlet.

Other objects and advantages of the invention may be apparent from the following specification, appended claims and accompanying drawings, in which:

Figure 1:
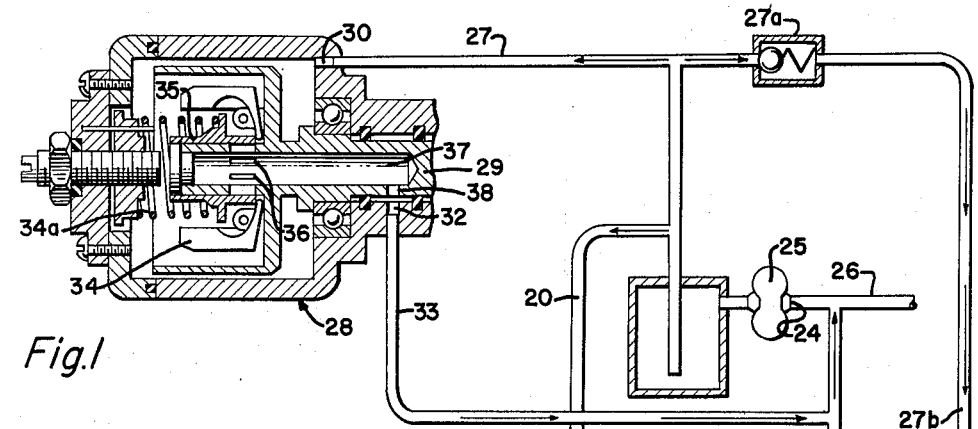
FIG. 1 is a diagrammatic view of a gas turbine and fuel system, in accordance with the present invention, and showing portions of structure thereof fragmentarily and in section.

As shown in FIG. 1 of the drawing, a gas turbine 10 is provided with a compressor impeller 11 and a turbine 12, both mounted on a common shaft 13. A plenum 14 receives the output from the impeller 11 and conducts the same to a combustor 15 which discharges into a plenum 16 communicating with the inlet of the turbine 12. A fuel nozzle 17 is disposed in the combustor 15, and the probe 18 of a thermostatically operated vent valve 18a is arranged in the exhaust of the turbine 12.

A fuel bypass valve 19 is arranged to receive a supply of fuel through a tube 20 and to deliver fuel through a tube 21 to the nozzle 17. This bypass valve 19, by means of a tube 22, is also supplied with output pressure from the compressor 11. A tube 23 containing a check valve 23a, communicates with the bypass valve 19 in order to divert fuel under pressure from the tube 21 by permitting fuel to return to an inlet 24 of a fuel pump 25 which is connected for operation by the turbine. The check valve 23a is arranged to prevent reverse flow of fuel through the tube 23 into the valve 19.

The pump 25 receives fuel through a supply tube 26 and delivers the same through a tube 27 to a speed responsive fuel bypass valve 28 which serves as a governor after the turbine has attained normal or steady state operating speed. Communicating with the tube 27 is a pressure relief valve 27a which limits pump outlet pressure. Fuel relieved through the valve 27a is conducted to the inlet of the pump 25 via a tube 27b.

The speed responsive bypass valve 28 is provided with a shaft 29 which is driven by means of suitable reduction gearing, not shown, in connection with the turbine shaft 13. This bypass valve 28 is a conventional valve having a fuel inlet 30 communicating with the tube 27. The fuel bypass outlet 32 of the valve 28 communicates with a tube 33 which is arranged to return fuel to the inlet 24 of the fuel pump 25. When the rotation of the shaft 29 of the valve 28 exceeds a predetermined maximum rate, centrifugal flyweights 34 act in opposition to a spring 34a and move a sleeve valve element 35 axially of the shaft 29, permitting fuel to flow through ports 36 and into a bore 37, of the shaft 29, which communicates through ports 38 with the outlet 32. Thus, the fuel bypass valve 28, in response to an overspeed condition of the turbine shaft 13, directs fuel from its inlet 30 to its outlet 32 and back to the inlet 24 of the fuel pump 25.

Figure 2:
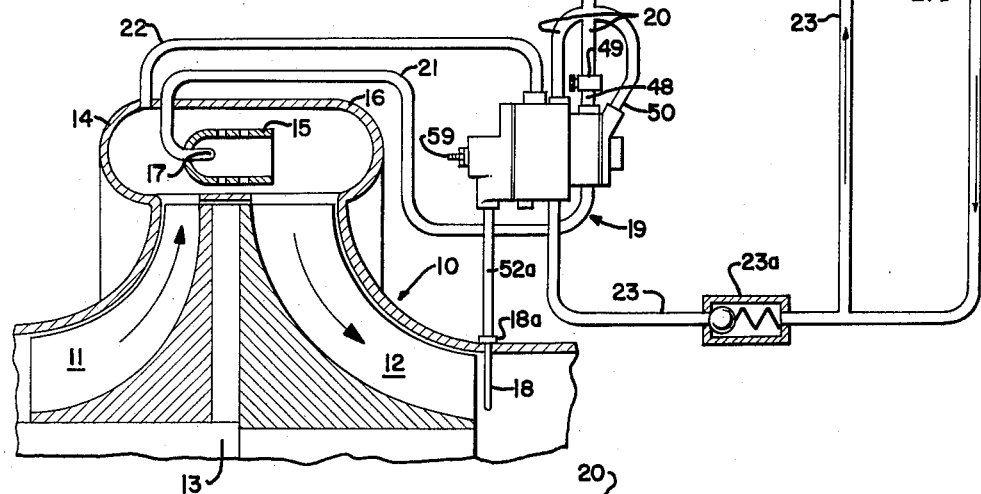
FIG. 2 is an enlarged axial sectional view of a fuel bypass valve of the present invention which operates in accordance with a relationship of compressor output pressure and fuel flow.

The fuel bypass valve 19, as shown in FIG. 2, is provided with a valve element 39 which controls communication between tubes 20 and 23. This valve element 39 is provided with a poppet head 40 which seats in a bushing 41 which is stationarily supported in the housing of the bypass valve 19. The valve element 39 is engaged at one end 42 by a push rod 43 which is connected with a diaphragm 44. A spring 45 tends to force the diaphragm 44 toward the valve element 39 and to maintain the push rod 43 in engagement therewith. The housing of the bypass valve 19 is provided with chambers 46 and 47 which are disposed at opposite sides of the diaphragm 44. Communicating with the chamber 46 is the tube 21 which extends directly to the fuel nozzle 17. Also communicating with the chamber 46 is a fuel inlet tube 48 which communicates through an adjustable orifice 49 with the tube 20. Communicating with the chamber 47 is a fuel conducting tube 50 which has unrestricted communication directly with the fuel supply tube 20. The diaphragm 44 is arranged to sense fuel flow which is indicated by a pressure differential created between fuel supply pressure in the tube 20 and fuel pressure in the chamber 46 at the downstream side of the adjustable orifice 49.

Operating in connection with the fuel bypass valve element 39, and in opposition to the fuel flow sensing diaphragm 44, is a compressor output sensing diaphragm 54. This diaphragm 54 is secured in the housing of the bypass valve 19, between chambers 53 and 60 therein. The chamber 53 is partially defined by another diaphragm 51 which has a substantially larger area than the diaphragm 54, the difference in areas being for a purpose to be set forth hereinafter. The chamber 53 communicates directly with the tube 22 which receives output pressure from the compressor 11. The diaphragms 51 and 54, together with a small fuel sealing diaphragm 55, are connected to a bolt 56 which engages the end of the valve element 39 opposite that engaged by the push rod 43. Since the side of the diaphragm 54, remote from the valve element 39, communicates directly with compressor output pressure through the tube 22, and the opposite side of the diaphragm 54 is exposed to atmospheric pressure via passage 60a, the bolt 56 and elements connected therewith will be urged toward the valve 39 by compressor output pressure in chamber 53. Pressures at opposite sides of the diaphragm 51 are normally equalized through the admission of compressor output pressure to chamber 52 through the restricted passage 57, and diaphragm 51 will be relatively ineffective except under certain unusual conditions of operation.

As mentioned previously, a thermostatically operated vent valve 18a is provided as a safety device to prevent turbine operation at excessive temperatures. This vent valve 18a is responsive to gas temperatures in the turbine exhaust. Valve 18a communicates by way of tube 52a with the chamber 52. When the exhaust gas temperature increases excessively, valve 18a opens, permitting pressure to escape from chamber 52 at a faster rate than it can be replaced through restricted passage 57. Pressure in chamber 52 will therefore fall and pressure in chamber 53 against diaphragm 51 will move bolt 56 and the elements connected therewith away from valve 39. At this time, the differential in fuel pressures applied to the diaphragm 44 will cause the valve 38 to an open position to bypass fuel from line 20 back to the fuel pump through passage 23.

Since valve 39 must be closed during the initiation of the starting operations of the turbine, a spring 58 is disposed in the chamber 52 to force the diaphragms 51 and 54 and the bolt 56 toward the valve element 39 to urge the latter in a closing direction. The spring 58 is adjustable, by means of a screw 59, and may be employed to predetermined proportions of the fuel mixture in the combustor 15 during starting operation of the gas turbine, as will be hereinafter described in detail.

Figure 3:
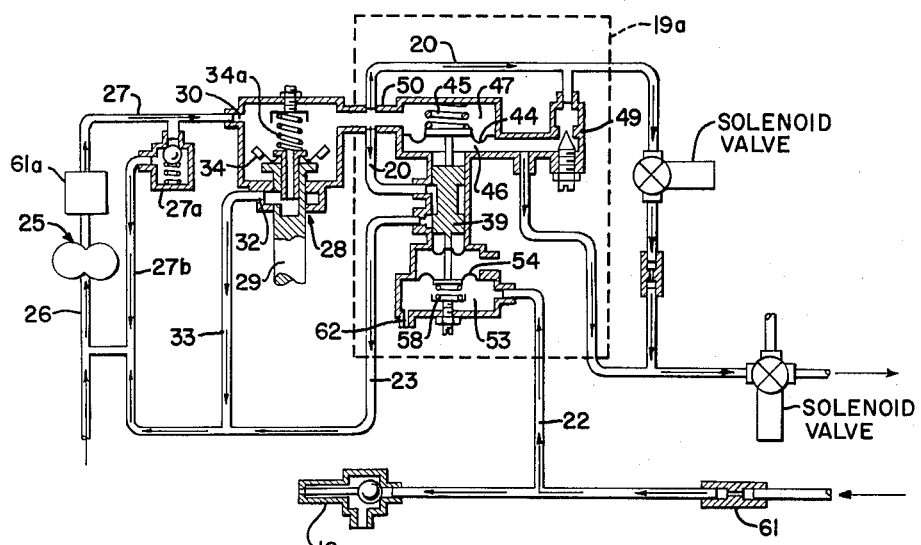
FIG. 3 is a diagrammatic view, similar to FIG. 1, of a gas turbine fuel system provided with a slightly modified form of fuel bypass valve embodying the principles of the present invention.
Figure 4:
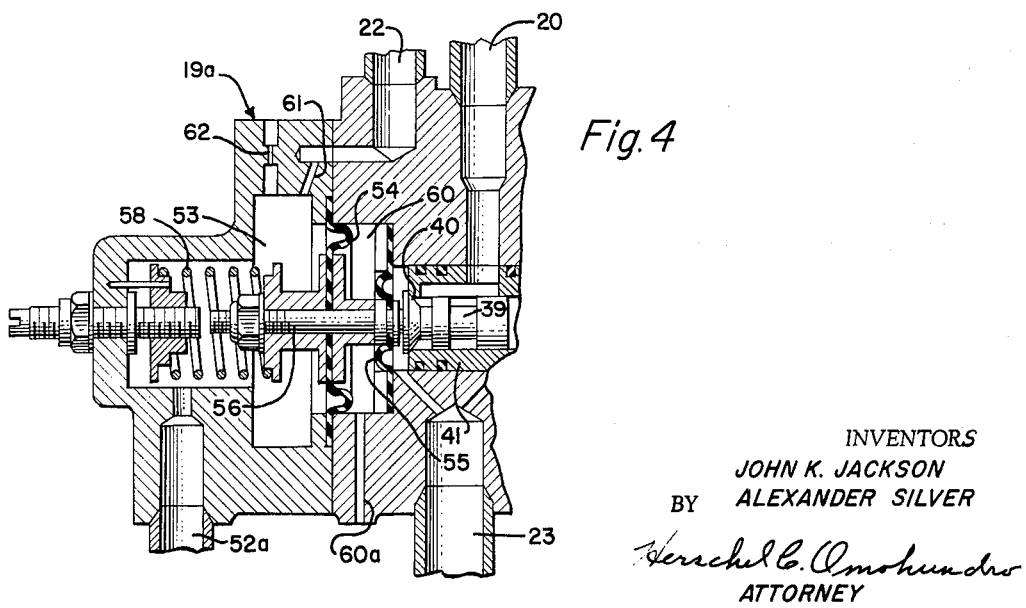
FIG. 4 is an enlarged axial sectional view, similar to FIG. 2, showing a portion of the modified bypass valve used in the system illustrated in FIG. 3.

FIGS. 3 and 4 show a slightly modified form of bypass valve, FIG. 3 depicting the system embodying the valve and FIG. 4 the modified portion of the valve.

It will be apparent from FIG. 3 that the system utilizing the modified valve is substantially identical with the system first described. To accentuate this similarity, components in the system of FIG. 3 will be identified by the same reference numerals as the corresponding parts of the system in FIG. 1. In the system of FIG. 3, the fuel is supplied through line 26 to pump 25 and delivered therefrom through tube 27 to a speed desponsive governor or bypass valve 28. A fuel filter 61a of suitable type may be provided between the pump and the governor 28 if so desired. A relief valve 27a is disposed in a line extending from the tube 27, in advance of the governor, to the supply line 26 upstream from the pump 25; the valve 27a determines the maximum fuel pressure in the system. From the governor 28 a line 33, constituting a bypass line, leads to the fuel supply line 26 so that fuel relieved by the governor may be readmitted to the fuel pump.

Under normal operating conditions, fuel flows from the tube 27 to the bypass valve 19a through line 20 which is provided with three branches, the first leading to the chamber for the bypass valve spool 39, the second leading to the chamber 46 and containing an adjustable restriction to form a variable orifice 49, and the third leading to chamber 47. As in the first form of the invention, fuel flow through the orifice 49 creates a pressure differential, the higher pressure of which is applied through passage branch 50 to chamber 47 and one side of diaphragm 44. The other side of this diaphragm is exposed to the lower pressure at the downstream side of orifice 49. Fuel from this side of the orifice or from chamber 46 flows through line 21 to the gas turbine engine combustor nozzle. The bypass valve 19a differs from the first form in that one diaphragm has been eliminated, thus making the device even simpler than before. As will be evident from FIG. 4, the bypass valve 39 may be moved to an open position to connect passages 20 and 23 and permit fuel to be directed back to the pump inlet. This action occurs when the higher pressure of the fuel pressure differential is sufficient to overcome the forces applied to valve 39 by spring 58 and compressor outlet pressure applied to diaphragm 54. As previously pointed out, compressor outlet pressure will be low during the initiation of operation of the engine. Fuel pressure, therefore, will cause diaphragm 44 to move valve 39 to open position to bypass some of the fuel. As compressor pressure increases, it will apply more force to diaphragm 54 to assist spring 58 in moving valve 39 toward a closed position. Compressor outlet pressure is supplied to the chamber 53 for application to diaphragm 54 through line 22. This line contains an orifice 61 and the valve housing contains a smaller orifice 62 leading from chamber 53 to the atmosphere to bleed a little air from chamber 53. As in the first form of the invention, the force of the fluid pressure applied to diaphragm 54 tends to move the valve 39 toward a closed position in opposition to the force of the fuel pressure applied to diaphragm 44. When compressor outlet pressure is high enough, valve 39 will be closed and no fuel will be bypassed by such valve. Fuel flow is controlled during normal engine operation by the governor 28.

As in the first form of the invention, a normally closed, thermally responsive valve 18a is connected with the bypass valve device to cause the bypass valve to open and bypass fuel when the engine approaches an overtemperature condition. This thermally responsive valve is connected, in the modified form of the invention, with chamber 53 or the line 22 downstream of the orifice 61. The thermostat of valve 18a is disposed in the engine exhaust duct and when the exhaust gas temperature reaches a predetermined high value, the valve 18a will open. Since fluid may then escape from chamber 53 to the atmosphere faster than it can flow through orifice 61, the pressure in chamber 53 will fall. The force supplementing that of spring 58 will thus be reduced and the fuel pressure may then move the bypass valve toward open position to reduce flow to the engine combustor nozzle. It is obvious that although diaphragm 51 has been eliminated, the bypass valve mechanism functions in the same manner as before, the opening of the thermostatic valve modifying the pressure or force applied to diaphragm 54.

Operation of the gas turbine fuel system of the present invention is substantially as follows:

When a gas turbine, as shown in FIG. 1 of the drawing, is started, rotational speed of the shaft 13 gradually increases, whereby speeds of the compressor 11 and fuel pump 25 are correspondingly increased. The fuel pump 25 is a positive displacement hydraulic fuel pump; therefore, during acceleration of the turbine 12, transient output pressure of the fuel pump 25 increases at a greater rate than corresponding output pressure of the compressor 11, which is a centrifugal compressor operating on air. The maximum fuel pressure at the outlet of the pump 25 is predetermined by the pressure relief valve 27a. Maximum fuel pressure is delivered by the pump when operating at a speed substantially less than a speed corresponding to the normal steady state speed of the compressor 11.

Since the fuel nozzle 17 is a fixed area nozzle and will admit fuel in proportion to the fuel pressure, and since proper combustion is predicated upon a fuel mixture involving a certain proportion of fuel and air, fuel pressure communicating with the nozzle 17 must be controlled relative to compressor output pressure.

The fuel bypass valve 19 is arranged to bypass fuel to the inlet of the pump 25 in accordance with compressor output pressure and fuel flow in order to maintain the proper fuel mixture in the combustor 15 throughout the acceleration range of the gas turbine from a start to a normal operating speed thereof. As the gas turbine accelerates after a start thereof, the pump 25 increases its output pressure at a rapid rate and will tend to cause excessive flow of fuel through the nozzle 17. At this time, however, fuel at the outlet side of adjustable orifice 49 and in chamber 46 is under a lower pressure in the chamber 46 than in the chamber 47 which communicates with the tube 20 at the upstream side of the adjustable orifice 49. Thus, the diaphragm 44 senses an increase in fuel flow and responds to a pressure differential caused by the orifice 49, tending to move forward the chamber 46 and the valve element 39. When the diaphragm 44 moves in this direction, it forces the push rod 43 against the end 42 of the valve element 39, causing the poppet head 40 to become unseated and permit fuel to flow from the tube 20 to the tube 23 which communicates with the inlet 24 of the pump 25. Thus, an excessive increase of fuel flow to the nozzle 17, during acceleration of the gas turbine, causes the diaphragm 44 to move the bypass valve element 39 to open position and thereby reduce fuel pressure. It will be understood that the pressure differential acting on the diaphragm 44 created by fuel flow is opposed by compressor output pressure acting on the diaphragm 54 via the tube 22. During acceleration of the gas turbine, the output pressure of compressor 11 increases, causing pressure to build up in the chamber 53. This pressure tends to oppose the force of the fuel pressure differential acting on the diaphragm 44. The area of the diaphragm 54 is so calculated that when subjected to the normal operating output pressure of the compressor 11, the force transmitted to the bolt 56, together with that imposed by the spring 58, is greater than opposing forces acting on the push rod 43; thus, the valve element 39 will be maintained in closed position when the gas turbine reaches its normal operating speed.

It will be understood that the speed responsive fuel bypass valve 28 becomes operative to limit the maximum speed of the device by bypassing fuel after the compressor output pressure acting on the diaphragm 54 closes valve element 40 of the fuel bypass valve 19. It may be possible for the fuel bypassing operations of the valves 19 and 28 to overlap within a certain speed range of the gas turbine which is close to a normal operating speed condition thereof. Fuel bypass operation of the two fuel bypass valves may be concurrent or overlap during some transient and overload operating conditions of the gas turbine.

It will be noted that adjustment of the spring 58 through the operation of screw 59 will provide for a variation of the mixture of fuel and air in the combustor 15 during starting operation of the gas turbine. An adjustment of the screw 59 to relax the spring 58 will cause the mixture to be relatively lean. When the spring 58 is thus relaxed, a relatively lower fuel flow rate sensed by the diaphragm 44 is capable of causing it to open the bypass valve element 39. Relaxation of the spring 58 tends to maintain a correspondingly lower fuel pressure in the tube 21 during starting operation of the gas turbine. Conversely, adjustment of the screw 59 to increase compression in the spring 58 will enrich the fuel mixture in the combustor 15 during starting operations of the gas turbine. When the gas turbine has reached a desired operating speed, normal compressor output pressure exists in the chamber 53 and acts on the diaphragm 54. Normal compressor output pressure acting on the diaphragm 54 overcomes the fuel pressure differential acting on the diaphragm 44 and holds the valve element 39 closed.

The orifice 49 is adjusted to provide for a maximum fuel content of the fuel mixture during the approach to steady state operating conditions of the gas turbine. After steady state operating conditions have been attained, the valve 39 is closed and the adjustment of the spring 58 has no effect on the fuel mixture. It will be understood that force of the spring 58, during starting of the gas turbine, is so adjusted that it provides for a slightly rich mixture, and due to a substantially constant rate of the spring it maintains a slightly rich mixture until steady state operating conditions have been attained. It will be noted, however, that while the weight flow of the compressor increases, the proportional richness of the mixture gradually decreases. This is due to the fact that the rate of the spring 58 is constant and it maintains the same additional amount of fuel flow, while the weight flow from the compressor continues to increase until the machine has reached a designed operating speed.

The fuel bypass valve 28, having its shaft 29 geared to the shaft 30 of the gas turbine, responds to an overspeed condition thereof and bypasses fuel, as hereinbefore described. Bypassing of fuel reduces fuel pressure communicating with the nozzle 17, thereby tending to prevent the gas turbine from overspeeding when a load thereon is reduced.

If an overload is applied to the gas turbine and the shaft speed thereof reduces, the fuel bypass valve 28 tends to reduce the amount of fuel bypassed and thereby increases fuel pressure to the nozzle 17 in order to match the load applied to the gas turbine and maintained efficient operating speed of the compressor 11.

In some instances during the operation of the device, particularly in turbines of the shaft power type, an overload may be applied to the turbine which will cause it to slow down sufficiently to permit the speed responsive fuel bypass valve 28 to close. At this time, even though the turbine may be operating at or close to normal speed, fuel flow will increase and the fuel pressure differential applied to the diaphragm 44 will increase rapidly, overcoming the force applied by air pressure to the diaphragm 54 and causing the bypass valve element 39 to open to prevent an excessively rich fuel mixture. The fuel flow responsive bypass valve 19 thus serves as a safety device to anticipate and prevent overheating of the turbine.

If the increased load applied to the gas turbine is excessive, or if components of the fuel system operate improperly and an excess of fuel is delivered through the nozzle 17 to the combustion chamber 15, temperature of the turbine may increase rapidly. Such a temperature increase will be sensed by the thermostatic valve 18a, which will open in response thereto and vent pressure from the chamber 52; then, the pressure differential, induced by fuel flow acting on the diaphragm 44, will overcome reduced opposing forces, causing the valve element 39 to open and permit fuel to be bypassed therethrough via the tube 23 to the inlet 24 of the fuel pump 25. In this manner, fuel pressure conducted to the nozzle 17 is reduced in response to an overheated condition of the gas turbine.

Attention is called to the novel cooperative relationship of the fuel bypass valves 19 and 28 whereby the gas turbine, during starting or transient operation, receives fuel in accordance with a relationship between compressor output pressure and fuel flow, while during normal operation of the gas turbine an overspeed condition thereof caused by reduced load thereon will be prevented by the speed sensitive fuel bypass valve 28. Also, an overload condition imposed upon the gas turbine will cause the bypass valve 28 to close, causing fuel flow to the nozzle 17 to increase. At this time the flow responsive fuel bypass valve 19 will operate to bypass some of the fuel and prevent overheating. In the event the flow responsive portion of the fuel bypass valve 19 fails to operate as intended and excessive fuel is delivered to nozzle 17, thermostat 18a will respond to exhaust temperatures in excess of a predetermined maximum to cause the fuel bypass valve 39 to open and reduce fuel to nozzle 17. Thermostat 18a and the portion of the valve mechanism 19 cooperating therewith thus serve as an additional safety device to prevent operation of the turbine at excessive temperatures.

Having thus described the present invention, it is desired to emphasize the fact that modifications thereof may be resorted to in a manner limited only by a just interpretation of the following claims.

We claim:

1. A bypass valve means for a gas turbine fuel system comprising: means providing a pair of passages adapted to communicate with a source of fuel under pressure, the first of said passages leading to an exhaust outlet and the second to an outlet adapted to be connected to a turbine combustor nozzle; a bypass valve in the first of said passages to control fuel flow therethrough; movable wall means disposed to move said bypass valve in opposite directions between open and closed positions; restriction means in the second of said passages for resisting fuel flow therethrough to create a pressure differential, a first portion of said wall means being exposed to such fuel pressure differential and operative upon an increase therein to move said bypass valve toward open position; resilient means disposed to yieldably resist movement of said bypass valve toward open position in response to said fuel pressure differential; means for applying fluid pressure from a second source to a second portion of said movable wall means to urge said bypass valve toward a closed position in opposition to said fuel pressure differential; and means for applying fluid pressure from a common source to opposed surfaces of a third portion of said movable wall means, including means for restricting fluid flow to one surface of said third portion whereby an increase in fluid pressure differential on said third portion of the movable wall means tends to open said bypass valve.

2. A bypass valve means for a gas turbine fuel system comprising: means providing a pair of passages for communication with a source of fuel under pressure, the first of said passages leading to an exhaust outlet and the second to a turbine supply outlet; a bypass valve in the first of said passages to control fuel flow therethrough; movable wall means disposed to move said bypass valve in opposite directions; restriction means in the second of said passages for resisting fuel flow therethrough to create a pressure differential, a portion of said wall means being exposed to such fuel pressure differential to move said bypass valve toward an open position in response to an increase in the pressure differential; resilient means disposed to yieldably resist movement of said bypass valve toward open position; means for applying fluid pressure from a second source to another portion of said movable wall means to urge said bypass valve toward a closed position; means for applying said fluid pressure from said second source to a third portion of said movable wall means to assist said fuel pressure differential in moving said bypass valve toward an open position; and thermally controlled means for modifying said pressure applied to said third portion.

3. A bypass valve means for a gas turbine fuel system comprising: means forming a plurality of axially aligned chambers, an intermediate chamber constituting a valve chamber having a valve seat therein; means providing a fuel inlet passage with three branches, one of which communicates with said valve chamber, the other branches communicating with one of the other chambers; a valve element disposed in said valve chamber for movement toward and away from said valve seat to close and open, respectively, said valve; a first movable wall in the chamber communicating with the branches of said fuel passage, said wall upon movement imparting motion to said valve element and dividing such chamber into sections, one communicating with one branch of said fuel inlet passage and the other communicating with the other branch of said fuel inlet passage; flow restricting means in one of the branches of said fuel inlet passage to create a pressure differential at opposite sides of said first movable wall to cause said wall to tend to move said valve toward an open position; a second movable wall and a third movable wall in another of said chambers, said second and third movable walls upon movement imparting motion to said valve element; means for applying fluid pressure from a common source to opposite sides of said second movable wall and to one side of said third movable wall thereby tending to move said valve element toward said seat; means operative under predetermined conditions to restrict flow to one side of said second movable wall to create a fluid pressure differential which tends to move said second movable wall in a direction to cause said valve element to move away from said valve seat; and resilient means tending to move said valve element toward a closed position.

4. A bypass valve means for a gas turbine fuel system comprising: means forming a plurality of axially aligned chambers, an intermediate chamber constituting a valve chamber having a valve seat therein; means providing a fuel inlet passage with three branches, one of which communicates with said valve chamber, the other branches communicating with one of the other chambers; a valve element disposed in said valve chamber for movement toward and away from said valve seat to close and open, respectively, said valve; a first movable wall in the chamber communicating with the branches of said fuel passage, said wall upon movement imparting motion to said valve element and dividing such chamber into sections, one communicating with one branch of said fuel inlet passage and the other communicating with the other branch of said fuel inlet passage; flow restricting means in one of the branches of said fuel inlet passage to create a pressure differential at opposite sides of said first movable wall to cause said wall to tend to move said valve toward an open position; second and third movable walls in another of said chambers, said second and third movable walls being operative to impart motion to said valve element; means for applying fluid pressure from a common source to opposite sides of said second movable wall and to one side of said third movable wall thereby tending to move said valve element toward said seat; means operative under a predetermined condition to restrict flow to one side of said second movable wall to create a pressure differential which tends to move said second movable wall in a direction to cause said valve element to move away from said valve seat; resilient means tending to move said valve element toward a closed position; and means for adjusting said resilient means to vary the valve closing force thereof.

5. Fuel bypass valve means comprising: body means forming a valve chamber with a fuel inlet and a fuel bypass outlet separated by a valve seat, said body means also forming a first actuating chamber at one end of said valve chamber and a second actuating chamber at the opposite end of said valve chamber, said first actuating chamber having first and second fuel inlets and an engine fuel feeding outlet, the second actuating chamber having a pair of fluid inlets of different capacities and a fluid outlet; a valve element disposed in said valve chamber for movement toward and away from said valve seat; movable wall means in said first actuating chamber between said first and second fuel inlets, said movable wall means upon movement imparting motion to said valve element; movable wall means in said second actuating chamber and upon movement imparting motion to said valve element, a portion of said second-mentioned wall means being exposed on opposite surfaces to fluid entering said fluid inlets, predetermined fluid flow from said second actuating chamber creating a pressure differential which tends to move said valve away from said seat; resilient means in said body tending to urge said wall means and valve element to a position in which said valve is closed; flow restricting means in said first fuel inlet to create a fuel pressure differential at opposite sides of said first-mentioned movable wall means, said pressure differential tending to move said valve element away from said seat; means for adjusting said flow restricting means to vary the fuel pressure differential; and means for adjusting said resilient means to vary the valve closing force.

6. Fuel bypass valve means comprising: body means forming a valve chamber with a fuel inlet and a fuel bypass outlet separated by a valve seat, said body means also forming a first actuating chamber at one end of said valve chamber and a second actuating chamber at the opposite end, said first actuating chamber having first and second fuel inlets and an engine fuel feeding outlet, the second chamber having a pair of fluid inlets of different capacities and a fluid outlet; a valve element disposed in said valve chamber for movement toward and away from said valve seat; movble wall means in said first actuating chamber between said first and second fuel inlets, said wall means upon movement imparting motion to said valve element; movable wall means in said second actuating chamber and upon movement imparting motion to said valve element, a portion of said second-mentioned wall means being exposed on opposite surfaces to fluid entering said fluid inlets; thermostatic means communicating with the fluid outlet of said second chamber to normally prevent fluid flow therefrom and equalize pressures on said opposed surfaces of said second-mentioned wall means; resilient means in said body tending to urge said wall means and valve element to a valve closing position; flow restricting means in said first fuel inlet to create a fuel pressure differential at opposite sides of said first-mentioned movable wall means, said pressure differential tending to move said valve element away from said seat; means for adjusting said flow restricting means to vary the fuel pressure differential; and means for adjusting said resilient means to vary the valve closing force.

7. Fuel bypass valve means comprising: means forming a pair of passages for communication with a source of fuel under pressure, the first of said passages leading to a bypass outlet and the second to a turbine supply outlet, said first passage having a portion forming a bypass valve chamber with a valve seat therein, said second passage having a portion forming a second chamber in alignment with said valve chamber at one end thereof, said means forming a third chamber in alignment with said valve chamber and at the opposite end thereof; a valve element disposed in said bypass valve chamber for movement toward and away from said valve seat; a first diaphragm means disposed in said second chamber and upon movement imparting motion to said valve element; restriction means in said second passage to create a pressure differential on fuel flowing to said turbine supply outlet, said pressure differential being applied to said diaphragm means to cause it to urge said bypass valve element toward open position; a second diaphragm means disposed in said third chamber and upon movement imparting motion to said valve element; means for directing fluid pressure to said second diaphragm to cause it to apply a closing force to said valve element; a third diaphragm means in said third chamber upon movement imparting motion to said valve element; means for applying fluid under pressure from a common source to opposite sides of said third diaphragm means; means operative under predetermined conditions to restrict flow of said fluid to one side of said third diaphragm to cause a pressure differential on said third diaphragm and move said valve element in an opening direction; and resilient means disposed to urge said valve element in a closing direction.

8. Fuel bypass valve means comprising: means forming a pair of passages for communication with a source of fuel under pressure, the first of said passages leading to a bypass outlet and the second to a turbine supply outlet, said first passage having a portion forming a bypass valve chamber with a valve seat therein, said second passage having a portion forming a second chamber in alignment with said valve chamber at one end thereof, said means forming a third chamber in alignment with said valve chamber and at the opposite end thereof; a valve element disposed in said bypass valve chamber for movement toward and away from said valve seat; a first diaphragm means disposed in said second chamber and upon movement imparting motion to said valve element; restriction means in said second passage to create a pressure differential on fuel flowing to said turbine supply outlet, said pressure differential being applied to said diaphragm means to cause it to urge said bypass valve element toward open position; resilient means disposed to urge said valve element in a closing direction; a second diaphragm means disposed in said third chamber upon movement imparting motion to said valve element, said second diaphragm means having primary and secondary diaphragms; means for directing fluid pressure to opposite sides of said primary diaphragm to render it normally ineffective and to one side of said secondary diaphragm to cause it to urge said valve element in a closing direction; and condition responsive means for relieving the pressure at only one side of said primary diaphragm to cause said bypass valve to be moved to open position by the fuel pressure differential applied to said first diaphragm means.

9. In a gas turbine fuel system, the combination of: a gas turbine having a compressor, a turbine and a combustor; a fuel pump driven by said turbine; a nozzle for said combustor arranged to receive fuel from said pump; a first fuel bypass valve communicating with said pump and said nozzle, said first fuel bypass valve having a first means responsive to output pressure from said compressor and a second means responsive to fuel flow to said nozzle; and a speed responsive fuel bypass valve operated by said turbine and communicating with said nozzle, said first and second means being opposed to each other and permitting force on said first means to oppose that acting on said second means whereby during starting and acceleration of said gas turbine to normal operating speed, the output pressure of said fuel pump increases at a greater rate than that of said compressor and causes said second means to overcome said first means and open said first fuel bypass valve, and subsequently, when said compressor attains normal output pressure, forces acting on said first means overcome forces acting on said second means, thereby closing said first fuel bypass valve, said speed responsive fuel bypass valve being arranged to open in response to a predetermined maximum speed of said turbine, thus the first fuel bypass valve controls fuel delivered to said combustor during transient operation of said gas turbine and the speed responsive fuel bypass valve controls the flow of fuel to the combustor during normal operation of the gas turbine thereby normally tending to prevent overspeeding.

10. In a gas turbine fuel system: a gas turbine having a compressor, a turbine and a combustor; a fuel pump driven by said turbine; a nozzle for said combustor arranged to receive fuel from said pump; a bypass valve disposed to divert fuel flowing from the outlet of said pump to the inlet thereof for varying fuel pressure at said nozzle; first diaphragm means disposed to force said bypass valve toward a closed position and including first and second diaphragms having a first chamber therebetween; second means for conducting pressure fluid discharged from said compressor into said first chamber; a second chamber communicating with the opposite side of said first diaphragm; a restricted passage intercommunicating with said first and second chambers, fluid pressure in said first and second chambers normally urging said diaphragm means to force said bypass valve toward a closed position; a thermostatic valve communicating with said second chamber, said thermostatic valve being disposed adjacent to said turbine and responsive to a predetermined temperature thereof to vent said pressure fluid from said second chamber; fluid flow responsive means including a third diaphragm disposed to force said bypass valve toward an open position thereof; a third chamber at one side of said third diaphragm and communicating directly with the outlet of said pump; a fourth chamber at the opposite side of said third diaphragm and communicating with said nozzle; and a restricted passage establishing communication between the fuel outlet of said pump and said fourth chamber.

11. In a gas turbine fuel system: a gas turbine having a compressor, a turbine, and a combustor; a fuel pump driven by said turbine; a nozzle for said combustor arranged to receive fuel from said pump; a bypass valve disposed to divert fuel flowing from the outlet of said pump to the inlet thereof for varying fuel pressure at said nozzle; first diaphragm means disposed to force said bypass valve toward a closed position and including first and second diaphragms having a first chamber therebetween; second means for conducting pressure fluid discharged from said compressor into said first chamber; a second chamber communicating with the opposite side of said first diaphragm; a restricted passage intercommunicating with said first and second chambers, fluid pressure in said first and second chambers normally urging said diaphragm means to force said bypass valve toward a closed position; a thermostatic valve communicating with said second chamber, said thermostatic valve being disposed adjacent to said turbine and responsive to a predetermined temperature thereof to vent said pressure fluid from said second chamber; an adjustable spring disposed in position to urge said first diaphragm means in a direction to force said bypass valve toward a closed position thereof; fluid flow responsive means including a third diaphragm disposed for movement to force said bypass valve toward an open position thereof; a third chamber at one side of said third diaphragm and communicating directly with the outlet of said fuel pump; a fourth chamber at the opposite side of said third diaphragm and communicating with said nozzle; a restricted passage establishing communication between said pump and said fourth chamber; and a spring urging said third diaphragm in a direction to force said bypass valve toward an open position thereof.

12. In a gas turbine fuel system: a gas turbine having a compressor, a turbine and a combustor; a fuel pump driven by said turbine; a nozzle for said combustor arranged to receive fuel from said pump; a bypass valve disposed to divert fuel flowing from the outlet of said pump to the inlet thereof for varying fuel pressure at said nozzle; a first diaphragm means disposed to force said bypass valve toward a closed position and including first and second diaphragms having a first chamber therebetween; second means for conducting pressure fluid discharged from said compressor into said first chamber; a second chamber communicating with the opposite side of said first diaphragm; a restricted passage establishing communication between said first and second chambers to equalize forces acting on opposite sides of said first diaphragm and permit force acting on said second diaphragm to urge said bypass valve toward a closed position; a thermostatic valve communicating with said second chamber, said thermostatic valve being disposed adjacent to said turbine and responsive to a predetermined temperature thereof to vent said pressure fluid from said second chamber; fluid flow responsive means including a third diaphragm disposed to force said bypass valve toward an open position thereof; a third chamber at one side of said third diaphragm and communicating directly with the outlet of said fuel pump; a fourth chamber at the opposite side of said third diaphragm and communicating with said nozzle; and a restricted passage establishing communication between the outlet of said fuel pump and said fourth chamber.

13. In a gas turbine fuel system: a gas turbine having a compressor, a turbine and a combustor; a fuel pump driven by said turbine; a nozzle for said combustor arranged to receive fuel from said pump; a bypass valve disposed to divert fuel flowing from the outlet of said pump to the inlet thereof for varying fuel pressure at said nozzle; first diaphragm means disposed to force said bypass valve toward a closed position and including first and second diaphragms having a first chamber therebetween, the area of said first diaphragm being greater than that of said second diaphragm; second means for conducting pressure fluid discharged from said compressor into said first chamber; a second chamber communicating with the opposite side of said first diaphragm; a restricted passage intercommunicating with said first and second chambers, whereby force acting on opposite sides of said first diaphragm may become equal, fluid pressure in said first chamber acting on said second diaphragm tending to urge said bypass valve toward a closed position; a thermostatic valve communicating with said second chamber, said thermostatic valve being disposed adjacent to said turbine and responsive to a predetermined temperature thereof to vent said pressure fluid from said second chamber; fluid flow responsive means including a third diaphragm disposed to force said bypass valve toward an open position thereof; a third chamber at one side of said third diaphragm and communicating directly with the outlet of said fuel pump; a fourth chamber at the opposite side of said third diaphragm and communicating with said nozzle; and a restricted passage establishing communication between the outlet of said pump and said fourth chamber.

References Cited by the Examiner

UNITED STATES PATENTS

| | | | |
|---|---|---|---|
| 2,457,595 | 12/1948 | Orr | 60—39.28 |
| 2,564,127 | 8/1951 | Orr | 60—39.28 |
| 2,667,743 | 2/1954 | Lee | 60—39.28 |
| 2,674,847 | 4/1954 | Davies et al. | |
| 2,697,328 | 12/1954 | Lee | 60—39.28 |
| 2,714,803 | 8/1955 | Abild | 60—39.28 |
| 2,989,850 | 6/1961 | Russ | 60—39.28 |

JULIUS E. WEST, *Primary Examiner.*

SAMUEL LEVINE, *Examiner.*

MARK NEWMAN, *Assistant Examiner.*